Patented Aug. 6, 1929.

1,723,138

UNITED STATES PATENT OFFICE.

ZOLTAN DE HORVATH, OF RIVERSIDE, ILLINOIS, ASSIGNOR TO THE EAGLE PICHER LEAD COMPANY, OF CINCINNATI, OHIO, A CORPORATION OF OHIO.

METHOD OF MANUFACTURING BLACK ASH.

No Drawing.   Application filed October 12, 1926.   Serial No. 141,233.

My invention relates to the manufacture of black ash the commercial name of the substance produced by heating a mixture of barytes and carbonaceous material to a temperature at which the barium sulphate is reduced to barium sulphide. This reduction is now quite commonly carried out in a rotary kiln through which the mixture is passed.

It is recognized that in the described method some of the barium sulphate is not reduced to soluble barium sulphide but forms insoluble compounds of barium which cannot be leached out from the black ash and I have discovered that this is notably true where the barytes contains a high percentage of silica which forms an insoluble barium silicate $BaSiO_3$ at the temperature to which the mixture is raised.

Where the reduction of the barytes is effected in a rotary kiln much trouble has been met with owing to ring formation in the kiln which tends to clog it by diminishing its diameter.

These ring formations are due to the mixture under treatment becoming pasty or partly fused at the temperature at which black ash is formed and I have discovered that this tendency to fusion of the black ash is largely due to the formation in it of compounds of barium sulphate and silica.

The object of my invention is to increase the quantity of barium sulphide in the black ash and particularly to prevent the formation of rings in the rotary kiln both of which objects I have discovered can be attained by adding to the mixture under treatment a substantial percentage of calcium carbonate which will combine with the silica present in the barytes and prevent it from combining with the barium sulphate and my invention consists, generally speaking, in mixing with the barytes and carbonaceous material previous to heating it to reducing temperature in a rotary kiln a substantial percentage of carbonate of calcium and in the use of such a mixture in a rotary kiln.

For ordinary commercial barytes which contains on average about 4.80% silica I find that the mixture should be in the proportion of 2000 lbs. barytes 600 lbs. coal and 200 lbs. limestone but more limestone or its equivalent should be used if the percentage of silica is greater.

The addition of limestone or its equivalent to the mixture under treatment notably increases the temperature of fusion of the black ash formed and prevents the formation of rings in the kiln and while this is clearly due in large part to the prevention of the formation of barium silicate it is also no doubt partly due to the fact that the presence of the lime in the black ash in itself increases its temperature of fusion and I therefore find it advantageous to use lime even where little or no silica exists in the barytes.

Having now described my invention, what I claim as new and desire to secure by Letters Patent is:

1. In the method of manufacturing black ash from barytes in which a mixture of barytes and carbonaceous material is passed through and heated in a rotary kiln the improvement which consists in adding to the said mixture carbonate of calcium in quantity sufficient to raise the temperature of fusion of the mass.

2. In the method of manufacturing black ash from barytes in which a mixture of barytes and carbonaceous material is passed through and heated in a rotary kiln the improvement which consists in adding to the said mixture carbonate of calcium in quantity sufficient to combine with a substantial quantity of the silica present in the barytes.

ZOLTAN DE HORVATH.